Nov. 2, 1937.  G. F. BECKER  2,097,911
VEHICLE BODY
Filed Aug. 8, 1936  2 Sheets-Sheet 1
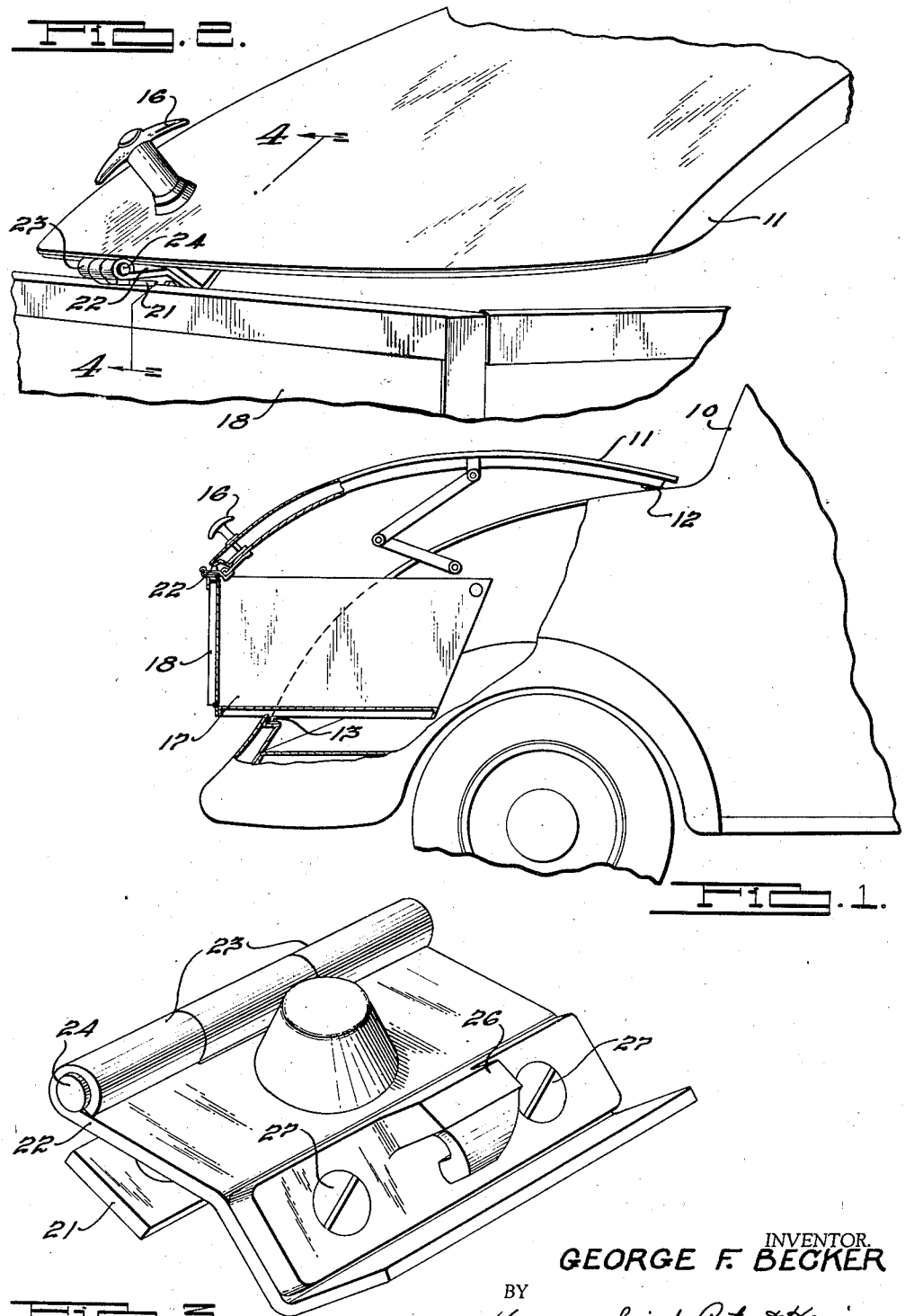
INVENTOR.
GEORGE F. BECKER
BY
Harness, Lind, Patee & Harris
ATTORNEYS.

Nov. 2, 1937. G. F. BECKER 2,097,911
VEHICLE BODY
Filed Aug. 8, 1936 2 Sheets-Sheet 2
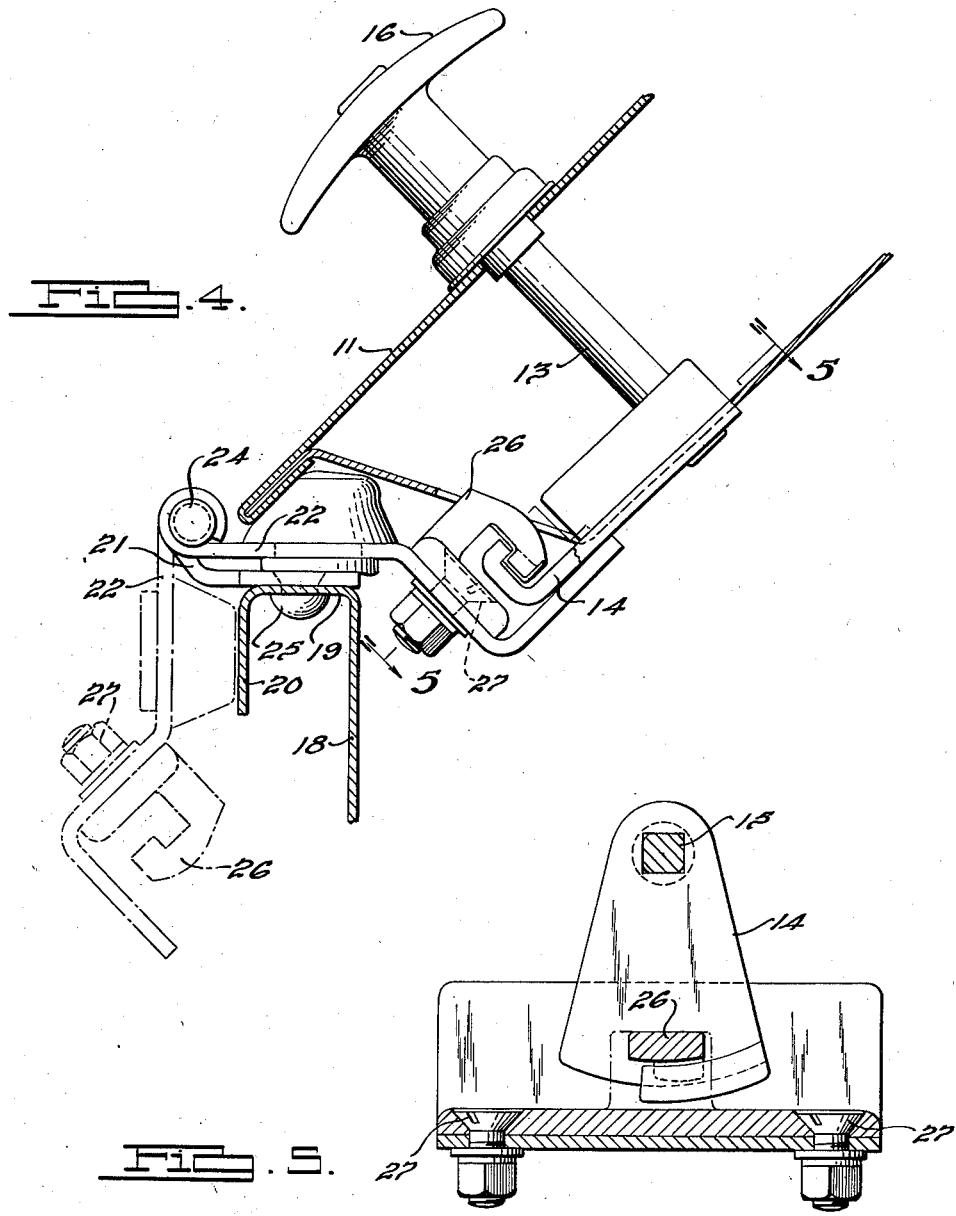
INVENTOR.
GEORGE F. BECKER
BY
ATTORNEYS.

Patented Nov. 2, 1937

2,097,911

UNITED STATES PATENT OFFICE 2,097,911

VEHICLE BODY

George F. Becker, Detroit, Mich., assignor to Chrysler Corporation, Highland Park, Mich., a corporation of Delaware Application August 8, 1936, Serial No. 94,908

5 Claims. (Cl. 296—26)

This invention relates to vehicle bodies and more particularly to a supplemental carrier therefor.

Vehicle bodies, especially those of the coupe type, are provided with a rear compartment for baggage and the like, which compartment is closed by a deck lid hinged to the body and adapted to be latched or locked in position with respect thereto. For the purpose of increasing the carrying capacity of these compartments, the bodies are frequently equipped with supplemental carriers, either fixed in position or movable with respect to the compartment. In general, these carriers include a bottom, side walls, and an outer end wall, the forward end being open. Loading and unloading of the carrier is greatly facilitated by pivotally mounting the end wall so that it may be swung into and out of closing position. It is desirable in using these carriers to provide a cover to protect the contents against the elements and to also latch or lock the cover in position to prevent unauthorized access to the carrier.

One of the main objects of this invention is to provide a supplemental carrier of the above type which is adapted to be installed in the rear compartment of a vehicle to increase the carrying capacity thereof and which may be closed by the conventional closure member for the body compartment.

Another object of the invention is to provide improved means for securing the closure member to the supplemental carrier, and more particularly to provide means of this character that may be moved into and out of operative position so as not to obstruct access to the carrier when the closure is open.

A still further object of the invention is to eliminate objectionable noises in equipment of this type resulting from vibrations set up by road shocks and particularly to prevent vibration of the closure when in locked condition and while the carrier is extended for use.

The above being among the objects of the present invention, the same consists in certain novel features of construction and combination of parts to be hereinafter described with reference to the accompanying drawings and claims, having the above and other objects in view.

An illustrative embodiment of the invention is shown in the accompanying drawings, in which:

Fig. 1 is a fragmentary side elevational view of a vehicle body embodying the invention, parts being broken away and shown in section to disclose the underlying structure.

Fig. 2 is a fragmentary perspective view of the rear end portion of the vehicle body shown in Fig. 1.

Fig. 3 is a perspective view of one of the latch elements shown in Figs. 1 and 2.

Fig. 4 is a sectional view taken on the line 4—4 of Fig. 2.

Fig. 5 is a sectional view taken on the line 5—5 of Fig. 4.

Referring to the drawings, the numeral 10 indicates a vehicle body of the coupe type having a rear compartment for baggage and the like, which compartment is closed by a lid 11, hinged at 12 to the body. A latch engageable element, shown at 13, is fixed to the body 10 interiorally of the compartment and is adapted to be engaged by a latching element 14 carried by the hinged lid 11 and manipulated by a shank 15 which is in turn operated by the handle 16 disposed exteriorally of the body. The handle 16 may be provided with suitable locking mechanism (not shown) to prevent disengagement of the latching element 14 from the element 13.

Mounted within the rear compartment of the vehicle body 10 and fixed thereto is a supplemental carrier, generally designated by the numeral 17, having side walls, a bottom and an end wall or gate 18 swingingly mounted with respect to the carrier to facilitate loading and unloading of the latter. The wall 18 has rearwardly and downwardly extending flanges 19 and 20, respectively, as best shown in Fig. 4. The lid 11 for closing the rear compartment is adapted to rest upon and be supported by the wall 18 of the carrier when the latter is in a vertical position, as shown in Fig. 1.

The lid 11 is retained in position with respect to the carrier 17 by means of latching mechanism including the latching element 14 carried by the lid 11 and cooperative means carried by the end wall 18 of the carrier 17. This latter means includes companion hinge plates 21 and 22 having cooperative inter-engaging eyes 23 aligned for receiving a pintle 24. The plate 21 is secured to the flange 19 of the wall 18 by rivets 25 or other suitable means. A latch engageable element 26 is secured by bolts 27 or the like to the plate 22 and is adapted to be engaged by the latching element 14 carried by the lid 11, as shown in Fig. 4. It will be understood that if desired the latch engageable element 26 may be formed integral with the plate 22. The latching elements 14 and 26 may be locked in engagement by suitable locking mechanism (not shown). When it is desired to latch or lock the lid 11 with respect to the carrier 17, the end wall 18 is moved to a vertical position and the hinge plate 22 disposed in the position indicated in full lines in Fig. 4, at which time the latching elements 14 and 26 may be engaged, the latching mechanism being disposed interiorly of the supplemental carrier 17. When the latching mechanism is in inoperative position, as in loading or unloading the carrier, the plate 22 may be rotated to the position shown by dotted lines in Fig. 4; that is, exteriorally of the carrier 17.

For the purpose of preventing objectionable vibration and noises which might otherwise result from contact of the lid 11 and hinge plate 22, or the plate 22 with the flange 20 of the end wall 18, the plate 22 is provided with a buffer 27, preferably comprising rubber, upon which the lid 11 rests when the parts are in the position indicated by full lines in Fig. 4, and which buffer in turn abuts the flange 20 of the wall 18 when the plate 22 is in the position indicated by dotted lines in Fig. 4. The buffer is preferably so constructed and arranged as to be subjected to compressive deflection when the closure is held in locked or latched position in order to tension the parts of the latching mechanism and to thereby prevent their unintended movement to released position. Tensioning of the latch elements also holds the latter and the closure against rattling and vibration.

I do not limit my invention, in the broader aspects thereof, to any particular combination and arrangement of parts such as shown and described for illustrative purposes since various modifications will be apparent from the teachings of my invention and scope thereof as defined in the appended claims.

I claim:

1. In a vehicle body including a storage compartment having a closure member therefor and a supplemental carrier for said compartment; mechanism for latching said closure member to said carrier comprising a latch engageable element carried by said carrier and a cooperating latching element carried by said closure member, said first named element receiving and supporting an end portion of said closure member.

2. In a vehicle body including a storage compartment having a closure member therefor and a supplemental carrier for said compartment having an end wall; mechanism for latching said closure member to said carrier comprising a latch engageable element pivotally mounted on said end wall and a cooperating latching element carried by said closure member, said first named element receiving and supporting an end portion of said closure member.

3. In a vehicle body including a storage compartment having a closure member therefor and a supplemental carrier for said compartment having an end wall; mechanism for latching said closure member to said carrier comprising a latch engageable element pivotally mounted on said end wall and a cooperating latching element carried by said closure member, said first named element having a resilient buffer receiving and supporting an end portion of said closure member in spaced relation to said carrier.

4. In a vehicle body including a storage compartment having a closure member therefor and a supplemental carrier for said compartment having an end wall; mechanism for latching said closure member to said carrier comprising a latch engageable element pivotally mounted on said end wall and a cooperating latching element carried by said closure member, said latch engageable element being movable to a position interiorally of said carrier for engagement with said latch engaging element and being movable to a position exteriorally of said carrier when said latching mechanism is inoperative, said latch engageable element having a yieldable buffer member adapted to be engaged by said closure member when said latch engageable element is positioned interiorally of said carrier and adapted to engage the end wall of said carrier when said latch engageable element is positioned exteriorally of said carrier.

5. A vehicle including a body portion having a rearwardly protruding storage compartment comprising stationary side and bottom walls, a closure member for said compartment forming the top and rear wall portions thereof, means comprising interengaging latching elements on said vehicle and closure member respectively for holding the latter in closed position, a supplemental carrier comprising a receptacle removably mounted in said compartment and extending beyond the rearward extremity thereof, said receptacle having an open upper extremity accessible through the upper open extremity of said compartment when said closure member is in open position, said receptacle including a pivotally mounted upwardly extending rear wall portion movable to open position for accommodating access to said receptacle and compartment from the rear of said vehicle, and latching apparatus on said pivotally mounted rear wall of said receptacle and engageable with the latching element on said closure member for supporting and latching the latter in covering relationship with respect to the upper open extremity of said compartment and receptacle.

GEORGE F. BECKER.